United States Patent [19]

Celis

[11] 4,392,875

[45] Jul. 12, 1983

[54] SMOG ELIMINATOR

[76] Inventor: Roberto V. Celis, Goodrich Village, Marikina, Philippines

[21] Appl. No.: 347,949

[22] Filed: Feb. 11, 1981

[51] Int. Cl.³ .............................................. B01D 47/00
[52] U.S. Cl. ...................................... 55/228; 55/260; 261/DIG. 9; 261/126
[58] Field of Search .......................... 55/89, 228, 260; 261/DIG. 9, 126

[56] References Cited

U.S. PATENT DOCUMENTS

| | | | |
|---|---|---|---|
| 1,065,985 | 7/1913 | Swem | 261/17 |
| 2,646,263 | 7/1953 | Goldberg | 261/126 |
| 3,460,819 | 8/1969 | Pike | 110/119 |
| 3,605,386 | 9/1971 | Erwin et al. | 55/228 |
| 3,823,531 | 7/1974 | Crawley | 55/228 |

Primary Examiner—Bernard Nozick
Attorney, Agent, or Firm—Keil & Witherspoon

[57] ABSTRACT

A device for eliminating carbon particulates from smoke including recirculating pressure water sprays within a spray booth mounted on a smoke stack, a conical deflector and a water collecting means mounted therein; the collected spray water being cleaned in a two compartment tank, partially filled with sand, and returned to the spray booth via a recirculation pump and a pressurized water reservoir.

2 Claims, 3 Drawing Figures

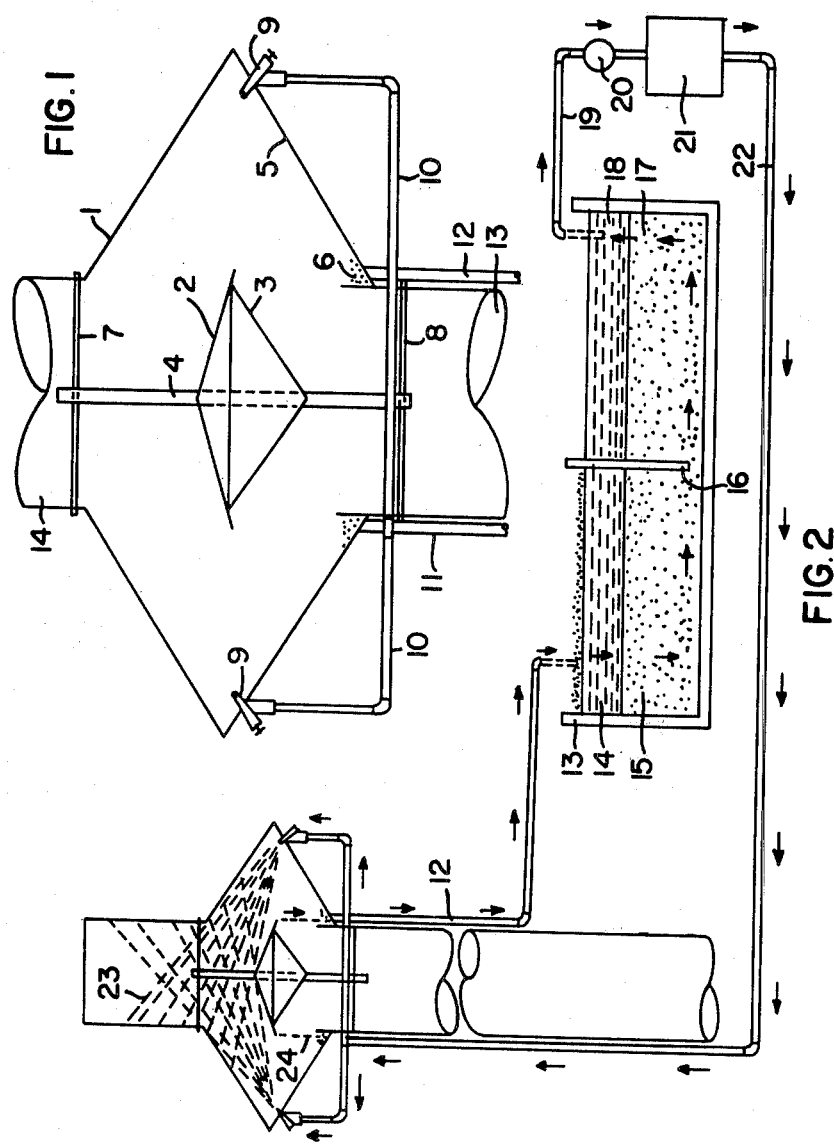

SMOG ELIMINATOR

This utility model relates to a smog eliminator and more specifically to an eliminator that utilizes a continuous flow of water as an agent that can collect the carbon particles in the smog and then deposit said carbon particles in a two-compartmented tank with dividing wall and half-filled with sand that acts as a filtering element. Said smog eliminator has conical smoke deflectors with water sprayers and collection gutters.

This is an improvement over my patent No. UM-2867 issued Feb. 1, 1978.

There are several smoke filters commonly used by industrial plants, among which are the electronic precipitator that causes the carbon to be collected by the negative electrode in the smoke stack, the water curtain type that causes the smoke to pass a curtain of flowing water, and many more. Each of these devices has its own advantages and disadvantages and is only adopted for a certain carbon content present in the smoke. Effective carbon filtration of the smoke is therefore the major problem still existing in this types of smog eliminator.

To remedy the existing problem of the prior art, I therefore provide for a smog eliminator using sprayed water that is conveyed to a two-compartmented tank with dividing wall and half-filled by sand that acts as a filtering element. Effective contacts of water and smoke are facilitated by multiple sprayers and the water carbon mixture is conveyed to a conical deflector which deposits it to the said tank.

The primary object of this model is to provide for a smog eliminator that can effectively collect the carbon and other particles that are present in an upwardly flowing smoke.

Another object is to provide for a smog eliminator using re-cycled water as the collecting agent of carbon.

A further object is to provide for a smog eliminator having a conical deflector with water sprayers that can cause water to contact an upwardly flowing smoke.

Other objects and advantages will clearly be understood upon reading the following specification taken in conjunction with the accompanying drawings, wherein:

FIG. 1 is the cut-away view of the smog eliminator of this model;

FIG. 2 is the pictorial view of the whole assembled smog eliminator of this model.

Figure 3:
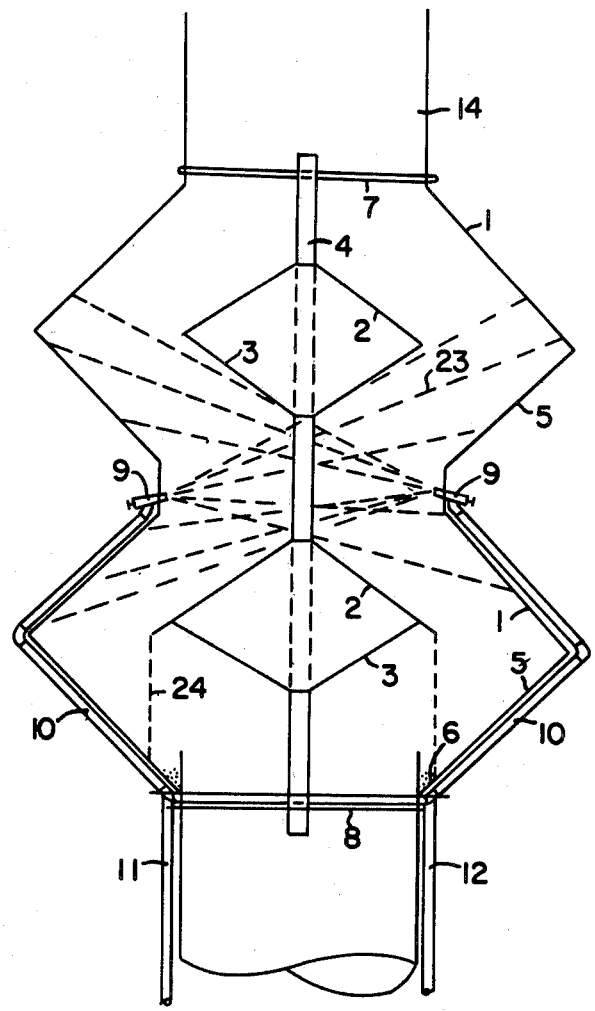
FIG. 3 is the cut-away view of the same eliminator when used as a two-stage booth.

Referring now to the different views of the drawings, the completely assembled smog eliminator of this model is shown in FIG. 2 and comprising a main booth which is adapted to be attached in series with a smoke stack or chimney 1; a two-compartment tank 13 with dividing wall 16; a water pump 20; a water tank 21; and the piping connections.

The main booth is shown in FIG. 1 of the drawing. The booth is fastened to the chimney by means of cross rods 7 and 8 that are interconnected by means of a vertical rod 4. This rod 4 holds a downwardly curving conical deflector 2 and an upwardly curving conical member 3. The sides of the booth are made of an upper downwardly curving cone 1 that is joined to an lower upwardly curving cone 5. On the upper end of cone 5 are attached a plurality of water spray nozzles 9 and at the bottom portion are attached the water collecting gutters 6.

The booth is attached to a water pump 20 with pressure tank 21 by means of water pipe 22, upwardly extending pipe 11 and distribution pipes 10. The gutter 6 is in turn attached to a down spout pipe 12 towards the water entry compartment of tank 13.

The water tank 13 is a rectangular tank having two compartments 15 and 17 that are separated by a vertically disposed wall 16. This tank 13 is half-filled with sand thereby causing said wall 16 to be embedded in the sand. It will be observed that when water is placed in said tank, the water will seek its own level. However, when polluted water 14 is placed in compartment 15 then said water will seep through the sand filter and surface on top of the sand as a filtered water 18.

With this action of the tank 13 water pumping connection is attached to said tank with the pump water suction pipe 19 of the pump 20 being dipped in the filtered water area of said tank and the water output being sprayed by means of a plurality of nozzles 9 inside the conical under surface of upper cone 1. The water recovery pipe 12 is then conveyed to the water entrance area 14 of the tank.

In operation, the water tank 13 is first filled with clean and clear water. Then the water pump 20 is started and suction of the water 18 from the tank begins. This water 18 is then conveyed to a tank 21 where pressure can build up. The compressed water is then sprayed by the plurality of nozzles 9 inside the booth. As smoke passes the water in fringes with the water mist, all carbon granules become wet and get heavier in weight. Due to this increase in weight the carbon granules and particles in the smoke fall down towards the upper surface of cone 2. Upon hitting cone 2 it then drips 24 on the tip of said cone and falls on the collection gutter 6. From here the polluted water is conveyed to the water entry side 15 of the tank. By the natural way of filtering, the carbon particles of the water are filtered. The clear water is then pumped to the booth over and over again up to the time that the filtering sand can not filter effeciently due to clogging.

In highly polluted flue gases the two-stage booth is recommended for efficient removal.

Having fully disclosed my model, what I claim and desire to be protected by a Letters Patent is:

1. A device for eliminating carbon particulates from smoke using continuous, recirculating, pressure water sprays in a uniquely designed spray booth which is mounted on a smoke stack and means for cleaning the recirculating pressure water, which comprises:

(a) a spray booth means comprising two conical sections joined at the bases thereof, the upper section being connected in a leak-proof way to the upper section of a smoke stack and the lower section being connected in a leak-proof way to the lower section of a smoke stack;

(b) a conical deflector means, centrally mounted by a mounting means within said spray booth means, having an upwardly directed vertex and a base diameter greater than the diameter of the lower section of said smoke stack;

(c) a spray means comprising a multiplicity of spray nozzles mounted around the inner circumference of the lower conical section of the spray booth means, adjacent to the juncture of the bases of the upper conical section and the lower conical section, and directed to spray above said conical deflector means within the upper conical section, whereby sprayed recirculating pressure water encounters rising smoke first as sprayed upward and second as deflected downward on striking the inside wall of the upper conical section of said spray booth;

(d) a water collecting means comprising the lower section of the smoke stack being connected to the lower conical section in a leak-proof way such that the upper-most edge of said smoke stack section protrudes into the spray booth means to form an annular water collecting gutter;

(e) a gravity drain means comprising a pipe mounted at the lowest edge of the lower conical section such that water in the water collecting means will drain through said pipe by gravity;

(f) an open water tank partially filled with sand and divided into two compartments by a partial vertical wall, said vertical wall being mounted so as to prevent flow from one compartment to the other except at the base thereof along the bottom of the open water tank;

(g) a recirculation pump; and (h) a pressurized recirculation water reservoir; whereby, smoke containing carbon particulates in the smoke stack rising into the spray booth means has particulates removed therefrom by entrainment in pressured water sprayed into the upper part of said spray booth means, the washed smoke thereafter rising into the upper section of the smoke stack while the pressurized water containing carbon particulates drops onto the conical deflector means and is deflected into the water collecting means, from which said water drains through the gravity drain means into the first compartment of the open water tank, passing through the sand filling and under the vertical wall into the second compartment of the open water tank by gravity, the majority of the carbon particulates being removed in the sand filling, being drawn into the recirculation pump, pumped into the pressurized recirculation water reservoir, and returned to the spray booth means through the spray means.

2. A device for eliminating carbon particulates from smoke using continuous, recirculating, pressure water sprays in a uniquely designed spray booth as recited in claim 1, wherein the spray booth comprises two compartments each of which comprises two conical sections joined and sealed at their bases, the two compartments being mounted in a smoke stack one on top of the other, joined by a cylindrical piece of a diameter the same as the smoke stack, having a multiplicity of spray nozzles mounted so as to pierce said cylindrical piece through leakproof openings and directed to spray both upwards into the upper compartment and downwards into the lower compartment, whereby the spray into the upper compartment is deflected downward from the upper conical section of the lower compartment.

* * * * *